(12) United States Patent
Sun et al.

(10) Patent No.: US 11,789,301 B2
(45) Date of Patent: Oct. 17, 2023

(54) LIGHT GUIDE PLATE INCLUDING MOUNTING PORTION, DISPLAY MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Jixing Sun, Beijing (CN); Xinrui Wang, Beijing (CN); Xiaoyang Guan, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 481 days.

(21) Appl. No.: 17/044,193

(22) PCT Filed: Sep. 4, 2019

(86) PCT No.: PCT/CN2019/104279
§ 371 (c)(1),
(2) Date: Sep. 30, 2020

(87) PCT Pub. No.: WO2021/042279
PCT Pub. Date: Mar. 11, 2021

(65) Prior Publication Data
US 2023/0105683 A1   Apr. 6, 2023

(51) Int. Cl.
*G02F 1/1333* (2006.01)
*F21V 8/00* (2006.01)

(52) U.S. Cl.
CPC ....... *G02F 1/133342* (2021.01); *G02B 6/005* (2013.01); *G02B 6/0021* (2013.01);
(Continued)

(58) Field of Classification Search
CPC .. G02B 6/0063; G02B 6/0086; G02B 6/0088; G02B 6/009; G02B 6/0091; G02F 1/133308; G02F 1/13332; G02F 1/133342
See application file for complete search history.

(56) References Cited

U.S. PATENT DOCUMENTS

2008/0291697 A1   11/2008  Sun
2010/0080019 A1*   4/2010  Iwasaki ............... G02B 6/0091
                                                        362/628
(Continued)

FOREIGN PATENT DOCUMENTS

CN    201083921 Y    7/2008
CN    102840550 A   12/2012
(Continued)

OTHER PUBLICATIONS

Office Action dated Apr. 28, 2020 in counterpart CN Patent Application No. 201980001585.X, 17 pages.
(Continued)

*Primary Examiner* — Keith G. Delahoussaye
(74) *Attorney, Agent, or Firm* — Procopio, Cory, Hargreaves & Savitch LLP

(57) ABSTRACT

A light guide plate includes: a light guide plate body having two light-exit surfaces that are opposite and parallel, and at least one light-incident surface that intersects the two light-exit surfaces; and a mounting portion located on a non-light-incident side of the light guide plate body. The mounting portion and the light guide plate body are an integrated structure, and a portion of the mounting portion located on a light-exit side of each light-exit surface of the two light-exit surfaces is configured to mount an optical film group and a display panel.

18 Claims, 10 Drawing Sheets

(52) U.S. Cl.
CPC ......... *G02B 6/0063* (2013.01); *G02B 6/0088*
(2013.01); *G02B 6/0091* (2013.01); *G02F*
*1/133308* (2013.01); *G02F 1/13332* (2021.01);
*G02F 1/133314* (2021.01); *G02F 1/133317*
(2021.01); *G02F 1/133322* (2021.01)

(56) References Cited

U.S. PATENT DOCUMENTS

| | | | |
|---|---|---|---|
| 2012/0169967 A1* | 7/2012 | Han | G02F 1/1333 349/62 |
| 2015/0205037 A1* | 7/2015 | Hsiao | G02F 1/133615 362/613 |
| 2015/0323826 A1* | 11/2015 | Hsiao | G02F 1/133553 349/58 |
| 2016/0356950 A1 | 12/2016 | Zhou | |

FOREIGN PATENT DOCUMENTS

| | | |
|---|---|---|
| CN | 202884700 U | 4/2013 |
| CN | 104375323 A | 2/2015 |
| CN | 204403956 U | 6/2015 |
| CN | 204595396 U | 8/2015 |
| CN | 105090893 A | 11/2015 |
| CN | 206440921 U | 8/2017 |
| CN | 109765715 A | 5/2019 |
| CN | 110161755 A | 8/2019 |
| KR | 20190057172 A | 5/2019 |
| WO | 2014115439 A1 | 7/2014 |

OTHER PUBLICATIONS

Office Action dated Dec. 7, 2020 in counterpart CN Patent Application No. 201980001585.X, 19 pages.

* cited by examiner

LIGHT GUIDE PLATE INCLUDING MOUNTING PORTION, DISPLAY MODULE AND DISPLAY DEVICE

CROSS-REFERENCE TO RELATED APPLICATION

This application is a national phase entry under 35 USC 371 of International Patent Application No. PCT/CN2019/104279 filed on Sep. 4, 2019, which is incorporated herein by reference in its entirety.

TECHNICAL FIELD

The present disclosure relates to the field of display technologies, and in particular, to a light guide plate, a display module, and a display device.

BACKGROUND

With the development of display technologies, double-sided display devices are widely used in industries provided with window services such as the communication industry, financial industry, and transportation industry, so as to provide a humanized visual experience for users, and to meet demands of the users for diversified display.

SUMMARY

In one aspect, a light guide plate is provided. The light guide plate includes: a light guide plate body having two light-exit surfaces that are opposite and parallel, and at least one light-incident surface that intersects the two light-exit surfaces; and a mounting portion located on a non-light-incident side of the light guide plate body. The mounting portion and the light guide plate body are an integrated structure, and a portion of the mounting portion located on a light-exit side of each light-exit surface of the two light-exit surfaces is configured to mount an optical film group and a display panel.

In some embodiments, the mounting portion includes at least one bearing platform located on the light-exit side of each light-exit surface, and a surface of the at least one bearing platform facing away from the light-exit surface is configured to bear the display panel.

In some embodiments, there is a space between a surface of the at least one bearing platform facing the light-exit surface and the light-exit surface, and the space is configured to mount the optical film group.

In some embodiments, at least one through hole with an axis perpendicular to the light-exit surface is disposed in the at least one bearing platform; and the at least one through hole is configured to allow a fastener to pass therethrough, so as to fasten the optical film group mounted in the space.

In some embodiments, the mounting portion further includes a position-limiting portion located on a surface of the at least one bearing platform facing away from the light-exit surface. An orthographic projection of the position-limiting portion on the light-exit surface is outside an orthographic projection of the display panel on the light-exit surface. The position-limiting portion is configured to limit a movement of the display panel in at least parts of directions parallel to the light-exit surface.

In some embodiments, the light guide plate further includes at least one support portion. The mounting portion has at least one first end surface facing away from the light guide plate body. The at least one support portion is disposed on the at least one first end surface.

In some embodiments, the light guide plate has a light-exit area directly facing a display area of the display panel. The light guide plate further includes a light-shielding layer disposed on an outer surface of the mounting portion located outside the light-exit area.

In some embodiments, a material of the light-shielding layer includes an ink with a light transmittance of less than or equal to 10%.

In some embodiments, the surface of the mounting portion provided with the light-shielding layer is a matte surface.

In some embodiments, the light guide plate body includes a light guide plate body with netted dots or a light guide plate body with nanoparticles.

In another aspect, a backlight module is provided. The backlight module includes: the light guide plate as described above, and two optical film groups mounted in the mounting portion. The two optical film groups are located on two light-exit sides of the light guide plate body, respectively.

In some embodiments, the mounting portion includes at least one bearing platform located on the light-exit side of each light-exit surface of the light guide plate body. There is a space between a surface of the at least one bearing platform facing the light-exit surface and the light-exit surface, and each optical film group of the two optical film groups is inserted and mounted in the space. At least one through hole with an axis perpendicular to the light-exit surface is disposed in the at least one bearing platform. The backlight module further includes a fastener disposed to match each through hole. The fastener is in contact with a respective optical film group of the two optical film groups, and fastens the optical film group to the light-exit side of the light guide plate body.

In some embodiments, the backlight module further includes a backlight source disposed opposite to the at least one light-incident surface of the light guide plate body.

In another aspect, a display module is provided. The display module includes: the backlight module as described above, and two display panels mounted in the mounting portion. Each display panel is located on a side of a respective one of the two optical film groups facing away from the light guide plate body.

In some embodiments, the mounting portion includes at least one bearing platform located on the light-exit side of each light-exit surface of the light guide plate body. Each display panel of the two display panels is fastened to a surface of the bearing platform facing away from the light-exit surface.

In some embodiments, the backlight module further includes a backlight source. The display module further includes a base. The base is disposed opposite to a light-incident surface of the light guide plate body. The base further includes a backlight source accommodating groove disposed on a surface of the base opposite to the light-incident surface. The backlight source is disposed in the backlight source accommodating groove.

In some embodiments, the base further includes two circuit board accommodating grooves. Each circuit board accommodating groove is disposed on a respective one of two side surfaces of the base parallel to the light-exit surface. The display module further includes two circuit boards. Each circuit board is disposed in a respective circuit board accommodating groove of the two circuit board accommodating grooves and electrically connected to a corresponding display panel.

In some embodiments, the display module further includes two encapsulation cover plates disposed on the base, and each encapsulation cover plate of the two encapsulation cover plates is located on a side of a respective one of the two circuit boards facing away from a bottom of the circuit board accommodating groove. An orthographic projection of each circuit board on the light-exit surface is within an orthographic projection of a corresponding encapsulation cover plate on the light-exit surface.

In another aspect, a display device is provided. The display device includes the display module as described above.

BRIEF DESCRIPTION OF THE DRAWINGS

In order to describe technical solutions in some embodiments of the present disclosure more clearly, the accompanying drawings to be used in some embodiments of the present disclosure will be introduced briefly. Obviously, the accompanying drawings to be described below are merely some embodiments of the present disclosure, and a person of ordinary skill in the art may obtain other drawings according to those drawings.

DETAILED DESCRIPTION

Figure 1:
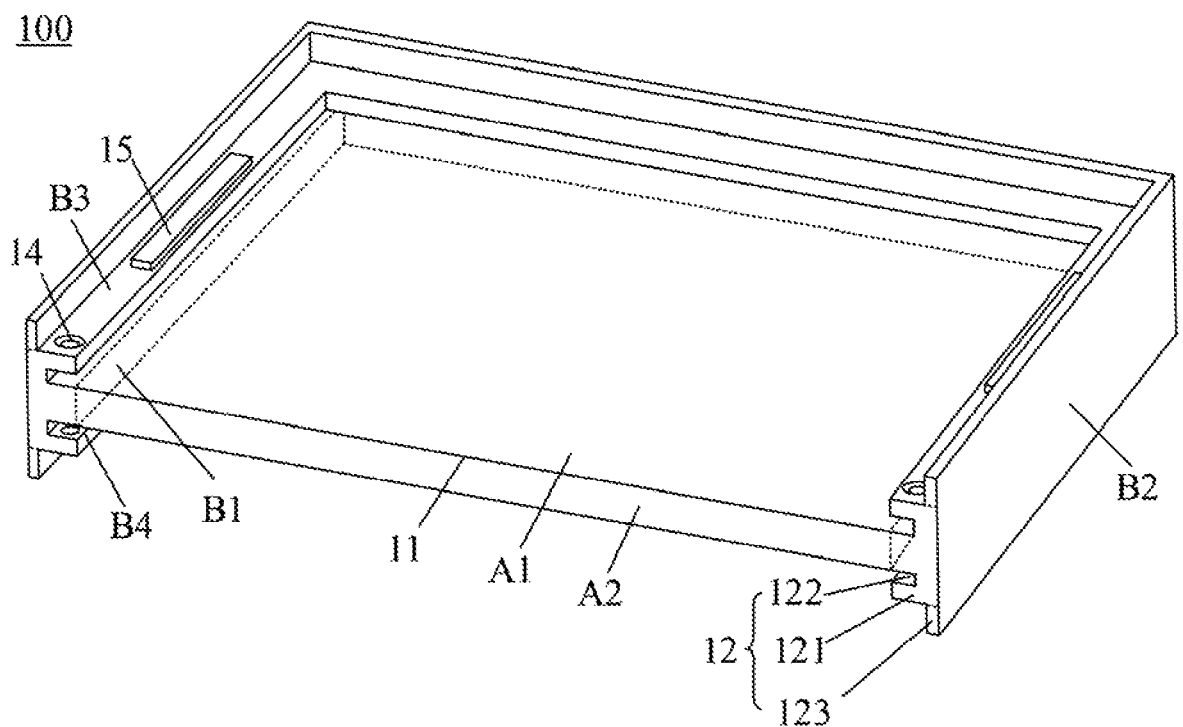
FIG. 1 is a schematic diagram of a light guide plate according to some embodiments of the present disclosure.

The technical solutions in embodiments of the present disclosure will be described clearly and completely in combination with the accompanying drawings in some embodiments of the present disclosure. Obviously, the described embodiments are merely some but not all of the embodiments of the present disclosure. All other embodiments made on the basis of the embodiments of the present disclosure by a person of ordinary skill in the art shall be included in the protection scope of the present disclosure.

In the related art, a double-sided display module in a double-sided display device mostly uses a structure in which a direct-type backlight module is equipped with two liquid crystal panels. The direct-type backlight module generally includes two backlight sub-modules that are opposite to each other. Each backlight sub-module at least includes a light board and an optical film group that are stacked on top of one another. In addition, a heat dissipation component configured to dissipate heat from two light boards is further disposed between the two backlight sub-modules. Thus, both the direct-type backlight module and the double-sided display module including the same in the related art have large thicknesses and poor assemblability.

Based on this, referring to FIGS. 1 to 5, and 12, some embodiments of the present disclosure provide a light guide plate 100. The light guide plate 100 includes a light guide plate body 11. The light guide plate body 11 has two light-exit surfaces A1 that are opposite and parallel, and at least one light-incident surface A2 intersecting the two light-exit surfaces A1. The light guide plate 100 further includes a mounting portion 12 located on a non-light-incident side of the light guide plate body 11. The mounting portion 12 and the light guide plate body 11 are an integrated structure. A portion of the mounting portion 12 located on a light-exit side of each light-exit surface A1 of the two light-exit surfaces A1 is configured to mount an optical film group 21 and a display panel 31.

In some examples, the light guide plate body 11 is made of a thermoplastic light-transmitting material. For example, the light guide plate body 11 is made of at least one of polycarbonate (PC), polymethyl methacrylate (PMMA), or methyl methacrylate-styrene copolymer (MS). Since the mounting portion 12 and the light guide plate body 11 are an integrated structure, the mounting portion 12 and the light guide plate body 11 are made of the same material. In addition, the light guide plate 100 including the mounting portion 12 and the light guide plate body 11 is manufactured by injection molding, which is not only convenient for manufacturing, but also has high production efficiency and low production cost.

The light guide plate body 11 is configured to make light incident into it pass through its two light-exit surfaces A1, so as to achieve a double-sided light exit, and some embodiments of the present disclosure do not limit its structure.

Figure 6:
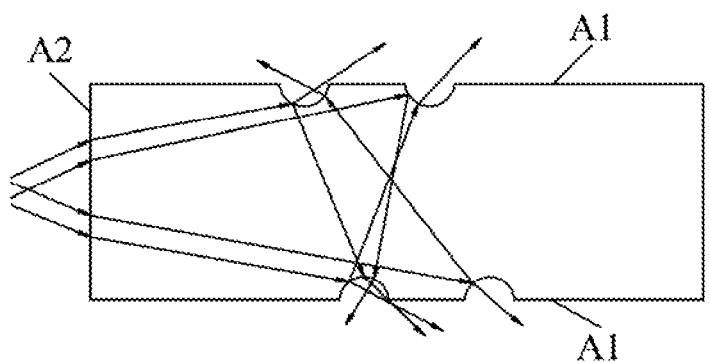
FIG. 6 is an optical path diagram of a light guide plate body according to some embodiments of the present disclosure.

In some examples, referring to FIG. 6, the light guide plate body 11 is a light guide plate body with netted dots. A plurality of microstructures, such as pits, microholes or microgrooves, or the like, are uniformly disposed on each light-exit surface A1 of the light guide plate body with netted dots. The microstructures in the light guide plate body with netted dots are generally formed by laser etching. The microstructures diffusely reflect and refract light irradiated thereon, which may ensure that the light guide plate body with netted dots has a stable and uniform light exit, and has a high light energy utilization efficiency.

Figure 7:
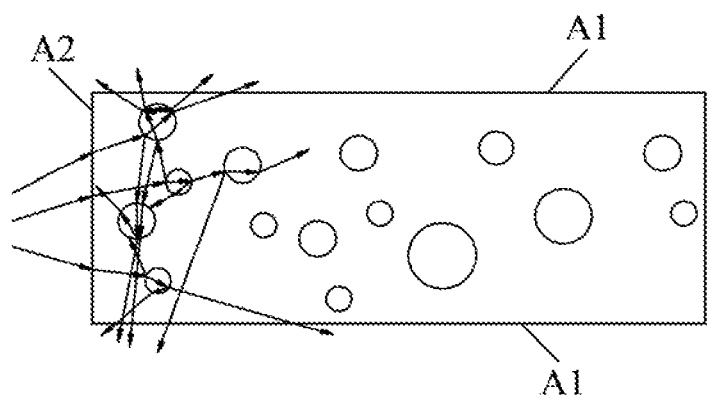
FIG. 7 is an optical path diagram of another light guide plate body according to some embodiments of the present disclosure.

In some other examples, referring to FIG. 7, the light guide plate body 11 is a nano light guide plate body. A plurality of nanoparticles, such as silicon dioxide nanoparticles, or polystyrene resin nanoparticles, or the like, are uniformly dispersed inside the nano light guide plate body.

The nanoparticles scatter light irradiated thereon, which may increase a conversion rate of light, so as to ensure that the nano light guide plate body has a high uniformity of light exit and a good light guide effect.

The light guide plate body 11 serves as a light propagation medium between a backlight source and the display panel 31. The light guide plate body 11 further has at least one light-incident surface A2 intersecting the two light-exit surfaces A1. Herein, the light-incident surface A2 of the light guide plate body 11 is a surface of the light guide plate body 11 that is configured to be opposite to a corresponding backlight source. The light-incident surface A2 of the light guide plate body 11 is disposed to intersect the two light-exit surfaces A1 of the light guide plate body 11, and two display panels are respectively located on the light-exit sides of the light guide plate body 11 corresponding to the light-exit surfaces A1. Therefore, the light guide plate body 11 is a side-type light guide, and the light guide plate 100 including the same is a side-type light guide plate.

The non-light-incident side of the light guide plate body 11 refers to a side of the light guide plate body 11 where a non-light-incident surface is located. Hereinafter, an inner end surface B1 is introduced to schematically illustrate a relative positional relationship between the mounting portion 12 and the light guide plate body 11. Herein, the inner end surface B1 is a virtual surface, that is, the inner end surface 61 is an invisible surface. The inner end surface B1 is a surface of the mounting portion 12 configured to be integrally connected to the light guide plate body 11. There are one or more inner end surfaces B1, and the number of the inner end surface(s) B1 is related to an actual structure of the light guide plate body 11 (for example, a number of the light-incident surface(s) A2).

For example, any inner end surface B1 of the mounting portion 12 intersects the two light-exit surfaces A1 of the light guide plate body 11, and the inner end surface B1 and the light-incident surface A2 of the light guide plate body 11 are located in different planes. That is, both the mounting portion 12 and the backlight source are located beside the light guide plate body 11, and the presence of the mounting portion 12 will not cause a physical interference to subsequent mounting of the backlight source, and will not affect the light exit of the light guide plate body 11 as well, which effectively improves a space utilization rate of a side of the light guide plate body 11.

The portion of the mounting portion 12 located on the light-exit side of each light-exit surface A1 of the light guide plate body 11 refers to a portion of the mounting portion 12 located outside the inner end surface B1 in a direction perpendicular to the light-exit surface A1. This portion is configured to mount a corresponding optical film group 21 and a corresponding display panel 31, and its structure may be disposed to match structures of the optical film group 21 and the display panel 31, so that a mounting of the corresponding optical film group 21 and the corresponding display panel 31 can be achieved.

In addition, a shape of the light guide plate body 11 may be selectively arranged according to actual needs. For example, the light guide plate body 11 is designed according to a shape of a display area of the corresponding display panel 31.

For example, the light guide plate body 11 has a cuboid structure as shown in FIG. 1. An upper surface and a lower surface of the cuboid are the light-exit surfaces A1. At least one of four side surfaces (i.e., front side surface, rear side surface, left side surface, and right side surface) of the cuboid located between the upper surface and lower surface is the light-incident surface A2. Except for the light-incident surface A2, other side surfaces of the four side surfaces are surfaces of the light guide plate body 11 abutting the mounting portion 12, which are opposite to the inner end surfaces B1 of the mounting portion 12. Herein, correspondingly, the light-incident surface A2 of the light guide plate body 11 is perpendicular to the two light-exit surfaces A1 of the light guide plate body 11.

In some examples, as shown in FIG. 1, the front side surface of the light guide plate body 11 is the light-incident surface A2. There are three inner end surfaces B1 of the mounting portion 12, which are opposite to the left side surface, the rear side surface, and the right side surface of the light guide plate body 11 in one-to-one correspondence. Thus, the mounting portion 12 is disposed on three sides, i.e., left, rear, and right sides of the light guide plate body 11.

Figure 3:
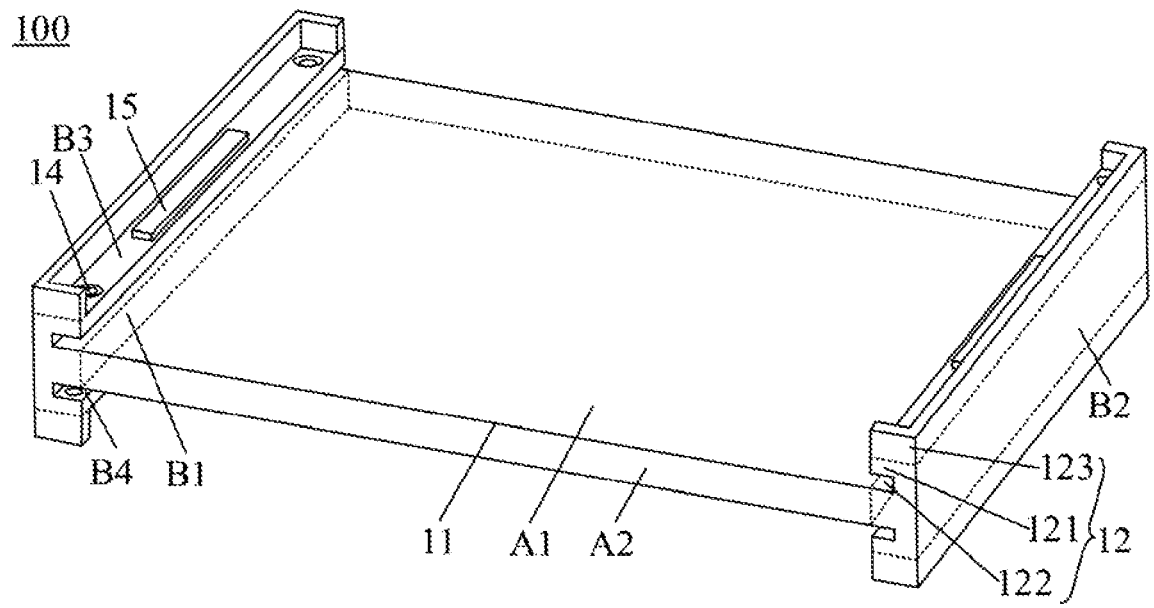
FIG. 3 is a schematic diagram of yet another light guide plate according to some embodiments of the present disclosure.

In some other examples, as shown in FIG. 3, the front surface and rear side surface of the light guide plate body 11 are the light-incident surfaces A2. There are two inner end surfaces B1 of the mounting portion 12. The two inner end surfaces B1 are opposite to the left side surface and right side surface of the light guide plate body 11 in one-to-one correspondence, and are not connected to each other. Thus, the mounting portion 12 includes two subparts respectively disposed on two sides, i.e., the left and right sides of the light guide plate body 11.

In some embodiments of the present disclosure, the light guide plate body 11 and the mounting portion 12 are an integrated structure, so that the light guide plate 100 composed of the light guide plate body 11 and the mounting portion 12 has a simple structure and is convenient to be manufactured. In this way, after the optical film group 21 and the display panel 31 are directly mounted on the corresponding portion of the mounting portion 12 located on the light-exit side of each light-exit surface A1 of the light guide plate body 11, an assembly of a display module 300 configured to display on double sides may be completed. Therefore, there is no need to additionally provide components, such as a backplane, a plastic frame, or the like, to mount and fasten the light guide plate 100, the optical film group 21 and the display panel 31. A process of mounting and fastening the mounting portion 12 and the light guide plate body 11 is omitted as well.

Thus, the backlight module 200 and the display module 300 that are simple in structure and easy to achieve a double-sided display can be provided, by utilizing the light guide plate, which is not only conducive to improving an assemblability of the backlight module 200 and the display module 300, but also to effectively reducing thicknesses of the backlight module 200 and the display module 300, thereby achieving an ultra-thinness of the display module 300.

Figure 12:
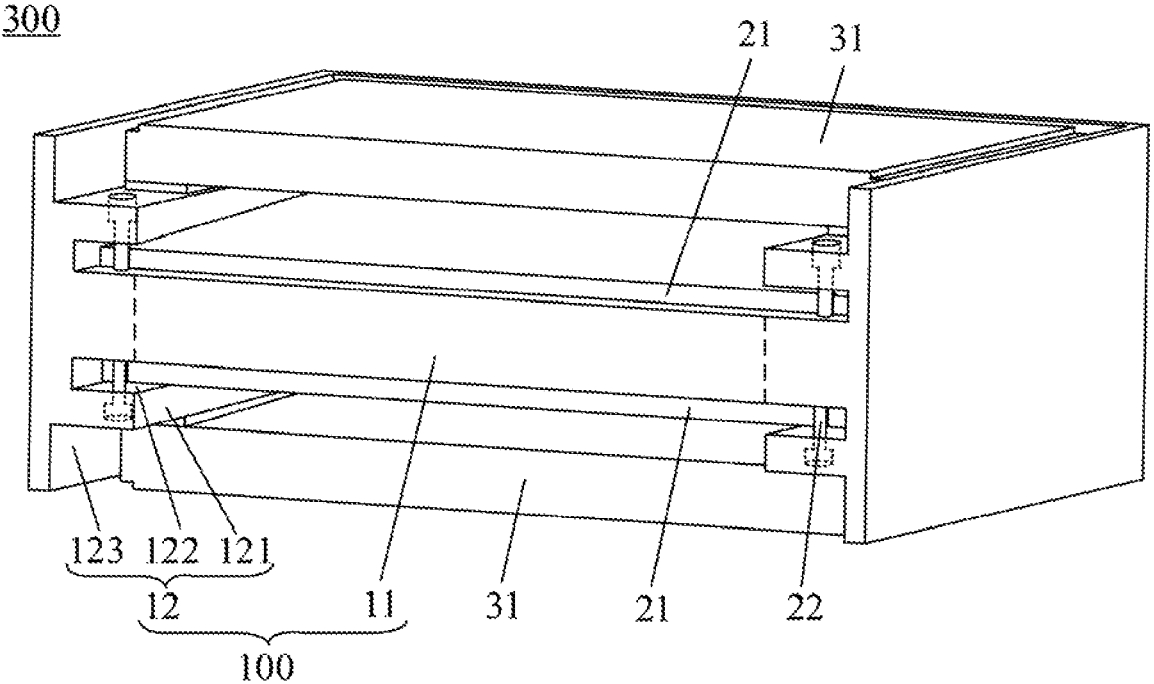
FIG. 12 is a schematic diagram of a display module according to some embodiments of the present disclosure.

In a case where the light guide plate 100 is applied to the display module 300 to achieve the double-sided display, a structure of the mounting portion 12 correspondingly matches the structures of the optical film group 21 and the display panel 31. Referring to FIG. 12, in the display module 300, the optical film group 21 is usually located on the light-exit side of the light-exit surface A1 of the light guide plate body 11, and the display panel 31 is usually located on a side of the optical film group 21 away from the light guide plate body 11. In this way, light emitted from each light-exit surface A1 of the light guide plate body 11 may sequentially pass through the corresponding optical film group 21 and the corresponding display panel 31, thereby achieving the double-sided display.

In some embodiments, referring to FIGS. 1 to 3, and 12, the mounting portion 12 includes at least one bearing platform 121 located on the light-exit side of each light-exit surface A1 of the light guide plate body 11. A surface B3 of the at least one bearing platform 121 facing away from the light-exit surface A1 is configured to bear the corresponding display panel 31. There is a space 122 between a surface B4 of the at least one bearing platform 121 facing the light-exit surface A1 and the light-exit surface A1, and the space 122 is configured to mount the corresponding optical film group 21. Thus, the mounting of the corresponding optical film group 21 and the corresponding display panel 31 may be directly completed, by utilizing the at least one bearing platform 121 disposed on the light-exit side of each light-exit surface A1 of the light guide plate body 11. The mounting operations of the optical film group 21 and the display panel 31 are simple, and the assemblability of the optical film group 21 and the display panel 31 is high.

Referring to FIGS. 1 to 3 again, in the at least one bearing platform 121, each bearing platform 121 refers to a convex platform of the mounting portion 12 extending in a direction parallel to the corresponding light-exit surface A1 and proximate to the light-exit surface A1. The convex platform and the space 122 of the light guide plate body 11 corresponding to the light-exit surface A1 constitute a mounting groove for accommodating and mounting the corresponding optical film group 21. A height of the space 122 (i.e., a distance between the surface B4 of the corresponding bearing platform 121 facing the light-exit surface A1 and the light-exit surface A1) is related to the thickness of the optical film group 21, as long as the optical film group 21 can be achieved to be inserted and mounted in the corresponding space 122.

Herein, a number of the bearing platform(s) 121 may be selectively arranged according to actual needs.

For example, as shown in FIG. 1, the mounting portion 12 includes one bearing platform 121 located on the light-exit side of each light-exit surface A1 of the light guide plate body 11, and the bearing platform 121 is disposed corresponding to an edge of the light guide plate body 11. Based on that each display panel 31 has a portion located within the display area and a portion located within the non-display area surrounding the display area, and a borne portion of each display panel 31 is generally the portion of the display panel 31 located within the non-display area. Therefore, an orthographic projection of the bearing platform 121 on the light guide plate body 11 is outside an orthographic projection of the display area of the corresponding display panel 31 on the light guide plate body 11. In this way, it is possible to prevent the bearing platform 121 from shielding the portion of the corresponding display panel 31 located within the display area, thereby avoiding affecting display effects of the corresponding display panel 31.

Figure 2:
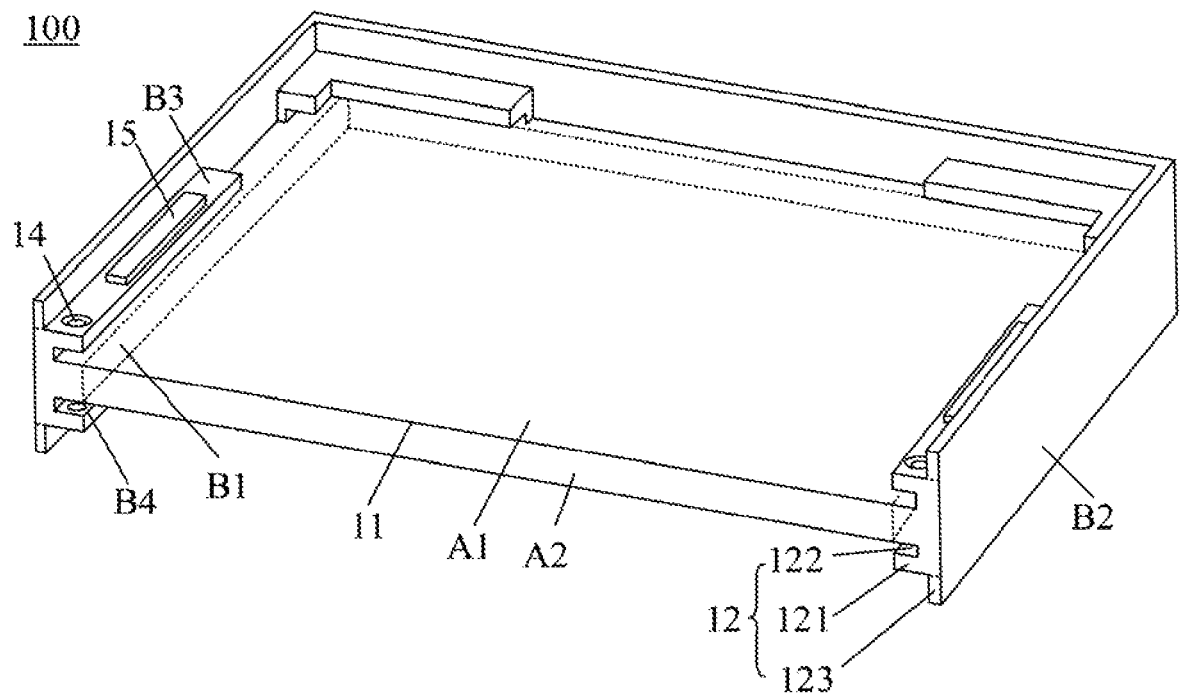
FIG. 2 is a schematic diagram of another light guide plate according to some embodiments of the present disclosure.

For example, as shown in FIG. 2, the mounting portion 12 includes a plurality of bearing platforms 121 located on the light-exit side of each light-exit surface A1 of the light guide plate body 11. The plurality of bearing platforms 121 are uniformly arranged corresponding to edges of the light guide plate body 11. Surfaces B3 of the plurality of bearing platforms 121 facing away from the light-exit surface A1 are in a same plane, which is convenient for utilizing the surfaces B3 to bear the display panel 31 stably, thereby completing the mounting of the display panel 31. Thus, the mounting operation of the display panel 31 is simple, and the assemblability of the display module 300 can be improved. In addition, orthographic projections of the plurality of bearing platforms 121 on the light guide plate body 11 are outside the orthographic projection of the display area of the corresponding display panel 31 on the light guide plate body 11.

In the case where the light guide plate 100 is applied to the display module 300 to achieve the double-sided display, if the optical film groups 21 located on two sides of the light guide plate body 11 have the same structure, and the display panels 31 located on the two sides of the light guide plate body 11 have the same structure, the mounting portion 12 has a structure symmetrically arranged with the light guide plate body 11 as a center, which is conducive to improving a commonality of the light guide plate 100. In addition, the mounting portion 12 has the structure, that is, the mounting portion 12 surrounds sides of the light guide plate body 11 in an "E" shape, which enables the light guide plate 100 including the mounting portion 12 and the light guide plate body 11 to have a strong resistance to a shear deformation. In this way, after the light guide plate 100 is applied to the display module 300, it is conducive to improving a structural rigidity of the display module 300.

Figure 5:
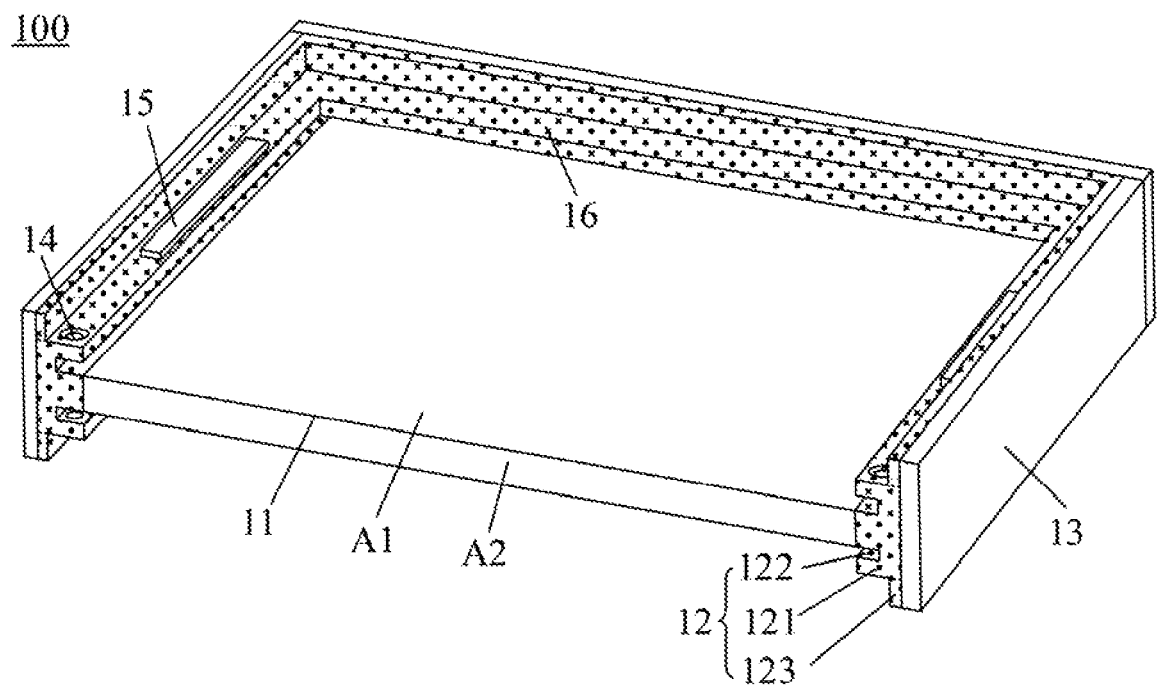
FIG. 5 is a schematic diagram of yet another light guide plate according to some embodiments of the present disclosure.

In some embodiments, referring to FIGS. 1 and 5, the mounting portion 12 has at least one first end surface B2. The first end surface(s) B2 is in one-to-one correspondence with the inner end surface(s) B1. Each first end surface B2 is located on a side of a corresponding inner end surface B1 facing away from the light guide plate body 11. The light guide plate 100 further includes at least one support portion 13 disposed on the at least one first end surface B2 of the mounting portion 12.

Herein, the first end surface B2 is an end surface of the mounting portion 12 facing away from the light guide plate body 11. There are one or more first end surfaces B2, and a number of the first end surface(s) B2 is related to the actual structure of the light guide plate body 11 (for example, the number of the light-incident surface(s) A2). The number of the support portion(s) 13 may be selectively arranged according to the number of the first end surface(s) B2. For example, each first end surface B2 of the mounting portion 12 is provided with one support portion 13 thereon. Each support portion 13 can provide a support to the mounting portion 12, thereby effectively enhancing a rigidity of the light guide plate 100, that is, an ability of the light guide plate 100 to resist the deformation, and thereby improving the structural rigidity of the display module 300.

The support portion 13 is usually made of a metal material with a high mechanical strength, such as alloy steel or galvanized steel. A structure of the support portion 13 and a connection between the support portion 13 and the mounting portion 12 may be selectively arranged according to actual needs, and some embodiments of the present disclosure do not limit these.

For example, the supporting portion 13 is a metal plate, a metal bar or a metal rod.

For example, the connection between the support portion 13 and the mounting portion 12 is a fixed connection or a detachable connection. In some examples, the support portion 13 is welded to the mounting portion 12. In some other examples, the support portion 13 is bonded to the mounting portion 12, for example, by using polyurethane reactive hot-melt adhesive (PUR). In some yet other examples, a threaded connection is used between the support portion 13 and the mounting portion 12.

In some of the embodiments, the optical film group 21 may be mounted in the corresponding space 122 in a plug-in manner. Referring to FIGS. 1 to 3 again, at least one through hole 14 with an axis perpendicular to the light-exit surface A1 is provided in the at least one bearing platform 121 located on the light-exit side of each light-exit surface A1 of the light guide plate body 11. In the at least one through hole 14, each through hole 14 is configured to allow a corresponding fastener 22 to pass therethrough, so as to fasten the optical film group 21 mounted in the space 122 by utilizing the fastener 22. The axis of each through hole 14 is perpendicular to the light-exit surface A1, which enables the fastener 22 passing through each through hole 14 to be in plane contact with the corresponding optical film group 21. For example, a surface of the fastener 22 passing through an end of the corresponding through hole 14 is in contact with a light-exit surface of the corresponding optical film group 21, or a side of the fastener 22 proximate to the corresponding optical film group 21 is in contact with a side of the corresponding optical film group 21 in a matching manner. Therefore, the optical film group 21 is relatively stably fastened in the corresponding space 122, which may effectively prevent the optical film group 21 from shaking or moving relative to the light guide plate body 11.

Herein, a number, a structure, and a position of the through hole 14 are related to the structure of the corresponding mounting portion 12, a structure of the corresponding fastener 22, and a manner of fastening the optical film group 21 by the corresponding fastener 22. Some embodiments of the present disclosure are not limited thereto, and the number, the structure, and the position of the through hole 14 may be selectively arranged according to actual needs.

In some examples, there are a plurality of through holes 14, and the plurality of through holes 14 are uniformly distributed on the corresponding bearing platform 121. Orthographic projections of the plurality of through holes 14 on the light guide plate body 11 are within an orthographic projection of the corresponding optical film group 21 on the light guide plate body 11. Herein, the through hole 14 is a threaded hole, and the fastener 22 is a threaded fastener whose end surface is a flat surface. In this way, the fastener 22 passes through the end of the corresponding through hole 14 to abut against the corresponding optical film group 21, which enables the optical film group 21 to be tightly attached to the light guide plate body 11 in a state that the fastener 22 is tightened. Therefore, a fastening of the optical film group 21 is achieved.

Figure 8:
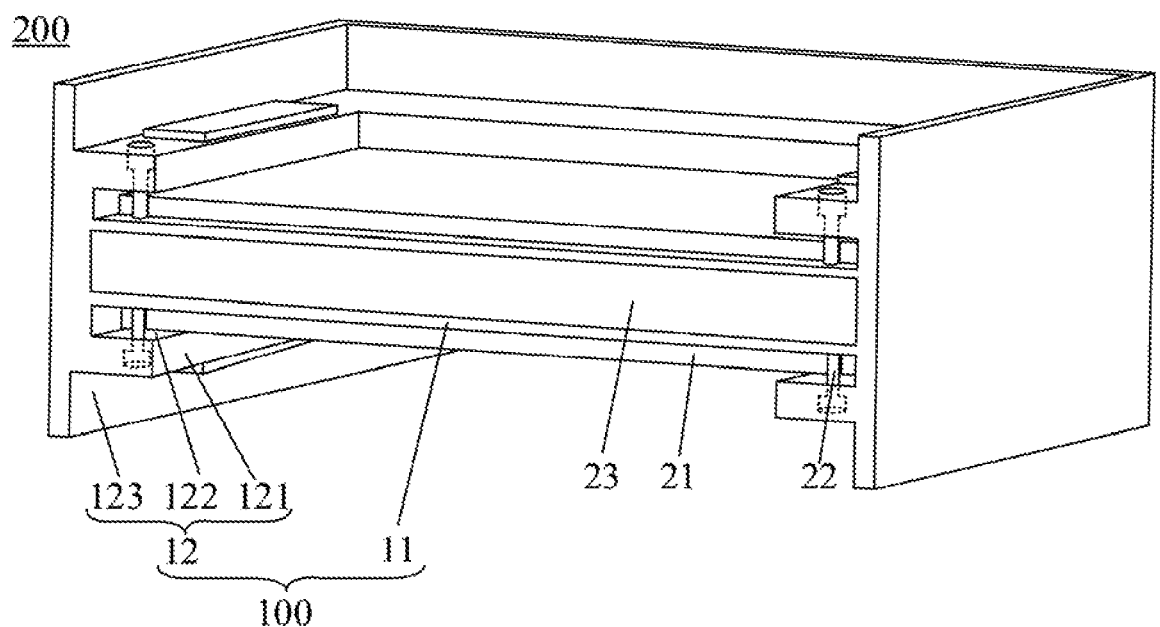
FIG. 8 is a schematic diagram of a backlight module according to some embodiments of the present disclosure.

In some other examples, as shown in FIGS. 1 and 2, the front side surface of the light guide plate body 11 is the light-incident surface A2. The mounting portion 12 is disposed on the three sides, i.e., the left, rear, and right sides of the light guide plate body 11. In this way, after the optical film group 21 is inserted and mounted in the corresponding space 122, a surface of the mounting portion 12 located in the space 122 can limit three sides, i.e., left, rear and right sides of the optical film group 21, and the light guide plate body 11 and the corresponding bearing platform 121 can limit two sides, i.e., upper and lower sides of the optical film group 21. Thus, two through holes 14 are provided on the at least one bearing platform 121 located on the light-exit side of each light-exit surface A1 of the light guide plate body 11. For example, as shown in FIG. 8, the two through holes 14 are respectively located on ends of the corresponding bearing platform 121 proximate to the light-incident surface A2, and orthographic projections of the two through holes 14 on the light guide plate body 11 are tangent to or partially overlap the orthographic projection of the corresponding optical film group 21 on the light guide plate body 11. In this way, a front side of the optical film group 21 may be limited by utilizing the fasteners 22 passing through the two through holes 14, thereby completing the mounting and fastening of the optical film group 21.

Herein, the limit of the fasteners 22 passing through the two through holes 14 to the optical film group 21 is a contact limit, which includes a plane contact limit or a curved surface contact limit.

Figure 9:
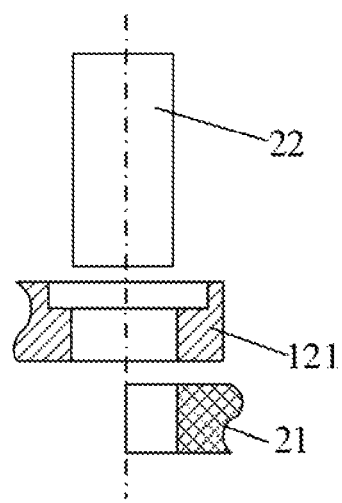
FIG. 9 is an assembly schematic diagram of a fastener in the backlight module shown in FIG. 8.

In some examples, referring to FIGS. 8 and 9, the through hole 14 is an unthreaded hole, the corresponding fastener 22 is a cylindrical pin, and a portion of the front side surface of the optical film group 21 is disposed to match a shape of the fastener 22. That is, an edge portion of the optical film group 21 corresponding to the through hole 14 is disposed as a semi-cylindrical groove, and a portion of the fastener 22 passing through the corresponding through hole 14 is fitted to the semi-cylindrical groove. The limit of the fastener 22 to the optical film group 21 is the curved surface contact limit.

Figure 10:
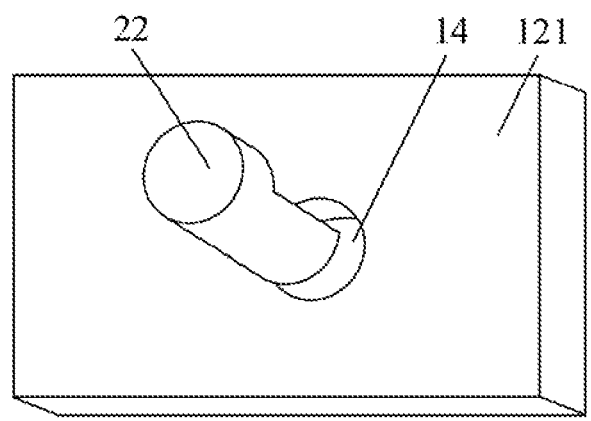
FIG. 10 is a schematic diagram of another fastener according to some embodiments of the present disclosure.
Figure 11:
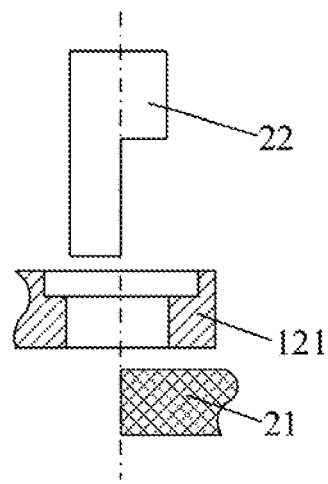
FIG. 11 is an assembly schematic diagram of the fastener shown in FIG. 10.

In some other examples, referring to FIGS. 10 and 11, a side surface of the front side of the optical film group 21 is disposed to be flat, the through hole 14 is an unthreaded hole, and the corresponding fastener 22 is a special pin. That is, a portion of the fastener 22 configured to be located in the through hole 14 is in clearance fit with the through hole 14, and a portion of the fastener 22 configured to be in contact with the optical film group 21 is disposed to match a shape of the optical film group 21. As shown in FIG. 11, the portion of the fastener 22 configured to be in contact with the optical film group 21 is a plane, and the portion of the fastener 22 passing through the corresponding through hole 14 is fitted to the side surface of the front side of the optical film group 21. The limit of the fastener 22 to the optical film group 21 is the plane contact limit.

Of course, the fastening of the fastener 22 to the optical film group 21 is not limited to the examples, and other methods that can fasten the optical film group 21 are also applicable, which may be selectively used according to actual needs.

In addition, for example, each through hole 14 has a counterbored hole structure, which enables an end of the corresponding fastener 22 away from the light-exit surface A1 to be located in the through hole 14, thereby ensuring that the bearing platform 121 provided with the through hole 14 will not be unable to maintain the plane contact with the display panel 31 due to the presence of the fastener 22, so as to avoid a problem that the display panel 31 is mounted unevenly.

In some of the embodiments, the display panel 31 can be mounted on a surface of the corresponding bearing platform 121 facing away from the light guide plate body 11, and the display panel 31 is bonded and fastened to the corresponding bearing platform 121, which can prevent the display panel 31 from falling off the bearing platform 121.

For example, referring to FIGS. 1 to 5, an adhesive portion 15, such as a double-sided tape, is disposed on the at least one bearing platform 121 located on the light-exit side of each light-exit surface A1 of the light guide plate body 11. The corresponding display panel 31 can be bonded to the bearing platform 121 effectively by utilizing the adhesive portion 15.

In some examples, the adhesive portion 15 is a double-sided foam tape, which not only can bond the corresponding display panel 31 to the bearing platform 121 effectively, but also can buffer the stress of the display panel 31 moderately. In addition, based on that the orthographic projection of the bearing platform 121 on the light guide plate body 11 is outside the orthographic projection of the display area of the corresponding display panel 31 on the light guide plate body 11, optionally, the adhesive portion 15 is a black double-sided foam tape.

Of course, a structure of the adhesive portion 15 is not limited to the examples. Some embodiments of the present disclosure do not limit this, as long as the corresponding display panel 31 can be bonded and fastened to the bearing platform 121.

In some embodiments, referring to FIGS. 1 to 5 again, the mounting portion 12 further includes a position-limiting portion 123 that is located on the at least one bearing platform 121 located on the light-exit side of each light-exit surface A1 of the light guide plate body 11. The position-limiting portion 123 is located on a surface of the at least one bearing platform 121 facing away from the light-exit surface A1 of the light guide plate body 11. An orthographic projection of the position-limiting portion 123 on the light-exit surface A1 is outside an orthographic projection of the corresponding display panel 31 on the light-exit surface A1. The position-limiting portion 123 is configured to limit a movement of the corresponding display panel 31 in at least parts of directions parallel to the light-exit surface A1.

For example, the position-limiting portion 123 includes a plurality of stop plates or stop blocks. The plurality of stop plates or stop blocks are in plane contact with side surfaces of the corresponding display panel 31 in at least two directions (herein, the side surfaces are surfaces of the display panel 31 perpendicular to the light-exit surface), which can limit the movement of the display panel 31 in at least two directions parallel to the light-exit surface A1.

In some examples, referring to FIGS. 1 and 2, the mounting portion 12 includes a U-shaped position-limiting portion 123 located on the light-exit side of each light-exit surface A1 of the light guide plate body 11, and the position-limiting portion 123 is disposed at an edge of the corresponding at least one bearing platform 121. In this way, after each display panel 31 is mounted on the corresponding bearing platform 121, the corresponding U-shaped position-limiting portion 123 may be used to limit the movement of the display panel 31 in the at least parts of the directions parallel to the light-exit surface A1. Herein, the at least parts of directions parallel to the light-exit surface A1 include, for example, a direction parallel to the light-exit surface A1 and towards left, a direction parallel to the light-exit surface A1 and towards right, and a direction parallel to the light-exit surface A1 and towards rear, or the like.

In some other examples, referring to FIG. 3, the mounting portion 12 includes two U-shaped position-limiting portions 123 located on the light-exit side of each light-exit surface A1 of the light guide plate body 11. Each of the two position-limiting portions 123 is disposed at an edge of the corresponding bearing platform 121 and the two position-limiting portions 123 are opposite to each other. In this way, after each display panel 31 is mounted on the corresponding bearing platform 121, the corresponding two position-limiting portions 123 may be used to limit the movement of the display panel 31 in all directions parallel to the light-exit surface A1.

A structure and a number of the stop plates or the stop blocks may be selectively arranged according to structures of the bearing platform 121 and the display panel 31, and some embodiments of the present disclosure do not limit these. In some examples, the position-limiting portion 123 and the corresponding bearing platform 121 are an integrated structure, and can be integrally formed, which is convenient for manufacturing.

It will be added that, a surface of the bearing platform 121 facing away from the light guide plate body 11 is taken as a reference plane, a height of the position-limiting portion 123 (i.e., a dimension of the position-limiting portion 123 in a direction perpendicular to the reference plane) is greater than or equal to a thickness of the corresponding display panel 31. Thus, the position-limiting portion 123 can also protect an edge portion of the corresponding display panel 31, to prevent the edge portion of the display panel 31 from being damaged due to an external force, such as an extrusion of the display panel 31 from a subsequent component to be assembled, or the like.

In some embodiments of the present disclosure, referring to FIG. 12, under an auxiliary limit of the corresponding position-limit portion 123, each display panel 31 can be more accurately mounted on the corresponding bearing platform 121 by utilizing the corresponding adhesive portion 15, to ensure that the display area of each display panel 31 directly faces an effective light-exit area of the light guide plate 100. That is, the light-exit area of the light guide plate 100 overlaps an orthographic projection region of the display area of the display panel 31 on the light guide plate 100, thereby improving a mounting accuracy of the display panel 11.

Figure 4:
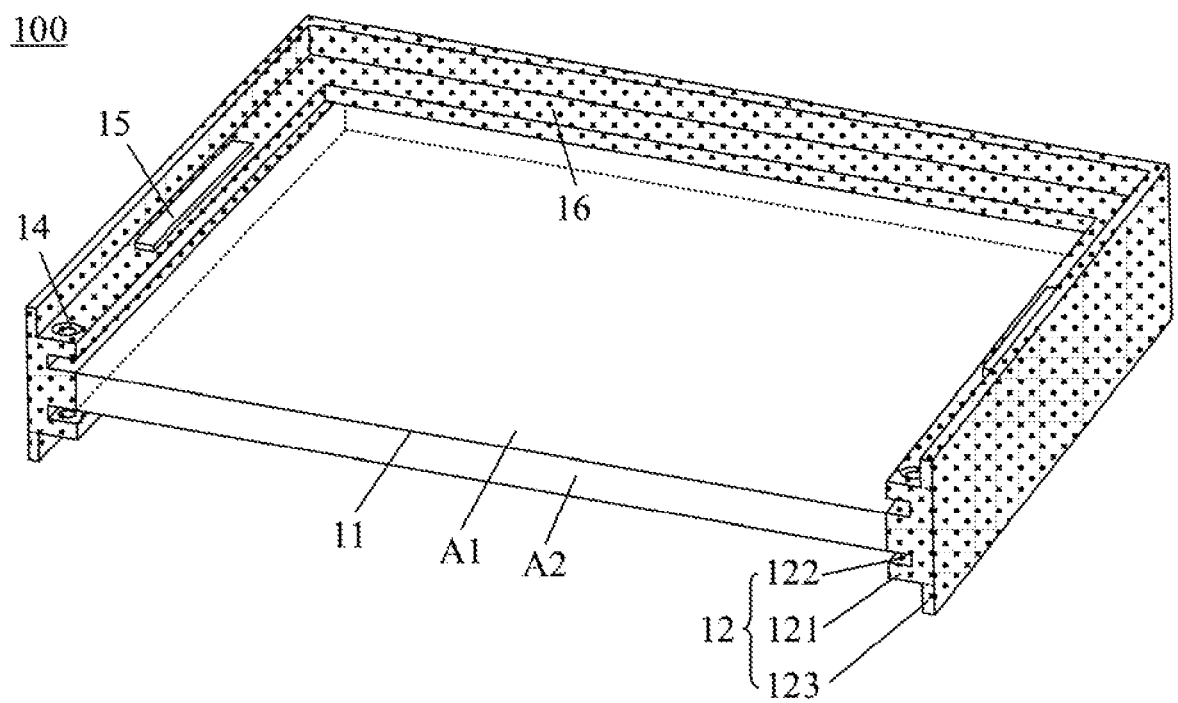
FIG. 4 is a schematic diagram of yet another light guide plate according to some embodiments of the present disclosure.

In some of the embodiments, the light guide plate 100 is made of a thermoplastic light-transmitting material, that is, the light guide plate 100 as a whole is able to transmit light. Referring to FIG. 4, the light guide plate 100 further includes a light-shielding layer 16. The light-shielding layer 16 is disposed on an outer surface of the light guide plate 100 located outside the light-exit area.

Optionally, the light-exit area of the light guide plate 100 is a projection region of the light-exit surface A1 of the light guide plate body 11 in a direction perpendicular to the light-exit surface A1. The outer surface of the light guide plate 100 located outside the light-exit area is an exposed surface of the mounting portion 12, which includes the first end surface(s) B2, an outer surface of each bearing platform 121, an outer surface of each position-limiting portion 123, and the like.

In some examples, the light-shielding layer 16 is made of an ink with a light transmittance of less than or equal to 10%, for example, a black ink. In this way, the ink may be effectively applied on the outer surface of the mounting portion 12 by shield spraying or dipping, to form the light-shielding layer 16, so as to prevent the light incident into the light guide plate body 11 from emitting from a side where the mounting portion 12 is located. That is, the light guide plate 100 can have an effect of preventing light leakage, which is conducive to improving the light exit efficiency of the light guide plate 100.

Of course, a material for making the light-shielding layer 16 is not limited to the ink, and any material that is able to be formed on the outer surface of the mounting portion 12 by applying and has a light-shielding performance may be applicable, which is not limited in some embodiments of the present disclosure.

In addition, in some examples, the surface of the light guide plate 100 provided with the light-shielding layer 16 is a matte surface. That is, a matte process is performed on the outer surface of the light guide plate 100 located outside the light-exit area, so that a surface roughness of the outer surface may be increased, thereby improving a surface adhesion of the light-shielding layer 16, to prevent the light-shielding layer 16 from peeling off or falling off.

Referring to FIG. 8, some embodiments of the present disclosure provide a backlight module 200. The backlight module 200 includes the light guide plate 100 as provided in some embodiments described above, and two optical film groups 21 mounted in the mounting portion 12. The two optical film groups 21 are located on the two light-exit sides of the light guide plate body 11, respectively.

The two optical film groups 21 are mounted in the mounting portion 12, which means that each optical film group 21 of the two optical film groups 21 is inserted and mounted in a corresponding mounting groove of the mounting portion 12, that is, in the space 122 between the light guide plate body 11 and the corresponding bearing platform 121.

Herein, the optical film group 21 generally includes at least one optical film of a diffusion sheet, a prism sheet, or a brightness enhancement sheet. Of course, a structure of the optical film group 21 is not limited to this, and any film that can perform optical processes such as diffusing, brightening, or polarizing on the light emitted from the light guide plate 100 may be applicable. In addition, in a case where the optical film group 21 includes a plurality of optical films stacked on top of one another, an arrangement order of the optical films may be selectively arranged according to actual needs, which is not limited in some embodiments of the present disclosure. For example, each optical film group 21 includes a diffusion sheet, a prism sheet, and a brightness enhancement sheet stacked on top of one another in a direction away from the corresponding light-exit surface A1.

Referring to FIG. 8 again, the backlight module 200 further includes a backlight source 23 disposed opposite to the at least one light-incident surface A2 of the light guide plate body 11. In some examples, a number of the backlight source(s) 23 is the same as a number of the light-incident surface(s) A2 of the light guide plate body 11, and the backlight source(s) 23 is in one-to-one correspondence with the light-incident surface(s) A2. In addition, the backlight source 23 may be a point light source (e.g., a light-emitting diode) or a linear light source (e.g., a light bar). The backlight source 23 may be directly fastened (e.g., bonded) to, or be indirectly fastened (e.g., fastened and connected through a fixed base) to the corresponding light-incident surface A2 of the light guide plate body 11. Some embodiments of the present application do not limit this.

After light emitted from the backlight source 23 passes through the corresponding light-incident surface A2 and enters the light guide plate body 11, it may propagate through the light-exit surfaces A1 on the two sides of the light guide plate body 11 and the optical film group 21 corresponding to each light-exit surface A1, to achieve a double-sided light exit of the backlight module 200.

Referring to FIGS. 8 to 11, the backlight module 200 further includes at least two fasteners 22. The at least two fasteners 22 are in one-to-one correspondence with the through holes 14 disposed on the bearing platforms 121 of the mounting portion 12. Each fastener 22 is disposed to match a corresponding through hole 14. A portion of each fastener 22 passing through the corresponding through hole 14 is in contact with the corresponding optical film group 21, which can fasten the optical film group 21 to the corresponding light-exit side of the light guide plate body 11. A structure of the fastener 22 and a fastening method of the fastener 22 to the optical film group 21 may be implemented by referring to the related descriptions in the foregoing embodiments, and will not be described in detail herein.

In some embodiments of the present disclosure, the two optical film groups 21 are respectively inserted and mounted in the corresponding spaces 122 in the mounting portion 12 of the light guide plate 100, to complete the assembly of the backlight module 200, which effectively improves the assemblability of the backlight module 200. Moreover, the backlight module 200 may achieve a double-sided light exit by using of such an assembly method, without additionally provided with components such as a backplane, a plastic frame, or the like, which can effectively reduce a thickness of the backlight module 200. In addition, the light guide plate 100 in the backlight module 200 has the same advantages as the light guide plate 100 in some embodiments described above. The beneficial effects achieved by the light guide plate 100 provided in some embodiments described above may also be achieved by the backlight module 200, which will not be repeated herein.

Referring to FIG. 12, some embodiments of the present disclosure provide a display module 300. The display module 300 includes the backlight module 200 provided in some embodiments described above, and a display panel 31 mounted in the mounting portion 12 and located on a side of each optical film group 21 facing away from the light guide plate body 11. Beneficial effects achieved by the display module 300 are the same as those achieved by the backlight module 200 provided in some embodiments described above, which will not be repeated herein.

A mounting method of the display panel 31 in the mounting portion 12 may be implemented by referring to the related descriptions in the foregoing embodiments, which will not be described in detail herein.

Referring to FIGS. 13 to 16, the display module 300 further includes a base 32. The base 32 is disposed opposite to one light-incident surface A2 of the light guide plate body 11. A backlight source accommodating groove 321 is provided on a surface of the base 32 opposite to the light-incident surface A2, and a backlight source 23 of the backlight module 200 is disposed in the backlight source accommodating groove 321.

For example, the base 32 is made of a metal material, so that the base 32 has a high structural strength and can provide a main body support for the display module 300.

For example, the backlight source accommodating groove 321 is a U-shaped groove, and a notch of the U-shaped groove is opposite to the corresponding light-incident surface A2. The backlight source 23 is a light bar. In this way, the light bar is mounted in the corresponding U-shaped groove, and the light bar may be positioned by utilizing the U-shaped groove, thereby ensuring that the backlight source 23 has a high mounting accuracy.

Referring to FIGS. 13 to 16 again, in some embodiments, each of two side surfaces of the base 32 parallel to the light-exit surface A1 of the light guide plate body 11 is provided with a circuit board accommodating grooves 322 thereon. The display module 300 further includes a circuit board 33 disposed in each circuit board accommodating groove 322, and each circuit board 33 is electrically connected to a corresponding display panel 31.

In some embodiments of the present disclosure, the backlight source accommodating groove 321 and the circuit board accommodating groove 322 are respectively disposed on different surfaces of the base 32, which enables the corresponding backlight source 23 and the circuit board 33 to be integrate in the base 32, thereby effectively improving a space utilization rate of the base 32. Therefore, a structure of the display module 300 can be simplified, which is conducive to achieving the ultra-thinness of the display module 300. In addition, in some examples, the base 32 is an aluminum extruded structural member, that is, the base 32 is formed by an aluminum extrusion molding process, which has a high molding accuracy and a high production efficiency, and is convenient for mass production.

Referring to FIGS. 13 to 16 again, in some embodiments, the display module 300 further includes two encapsulation cover plates 34. The two encapsulation cover plates 34 are disposed on the base 32, and each encapsulation cover plate 34 is located on a side of the corresponding circuit board 33 facing away from a bottom of the corresponding circuit board accommodating groove 322. An orthographic projection of each circuit board 33 on the corresponding light-exit surface A1 of the light guide plate body 11 is within an orthographic projection of the corresponding encapsulation cover plate 34 on the light-exit surface A1.

Optionally, a connection between each encapsulation cover plate 34 and the base 32 is a fixed connection or a detachable connection, which may be selectively arranged according to actual needs.

The encapsulation cover plates 34 are disposed on the base 32 in some embodiments of the present disclosure, which not only can encapsulate and protect the corresponding circuit boards 33 by utilizing the encapsulation cover plates 34, but also can effectively improve the resistance to the deformation (i.e., the structural rigidity) of the display module 300 in the direction perpendicular to the light-exit surface A1 of the light guide plate body 11 by utilizing a cooperation between the encapsulation cover plates 34 and the base 32. In addition, the display module 300 has the structure in some embodiments as described above, so that the display module 300 has a high structural integration degree and a high space occupancy rate, which can achieve the ultra-thinness of the display module 300.

In some examples, the encapsulation cover plate 34 is configured to encapsulate the corresponding circuit board 33, and a structure of the encapsulation cover plate 34 is disposed to match a structure of the circuit board 33 and an electrical connection between the circuit board 33 and the corresponding display panel 31.

For example, each circuit board 33 is electrically connected to the corresponding display panel 31 through a chip on film (COF) 330 or chip on flex (COF) 330. Orthographic projections of each circuit board 33 and the COF 330 electrically connected to the circuit board 33 on the corresponding light-exit surface A1 of the light guide plate body 11 are within the orthographic projection of the corresponding encapsulation cover plate 34 on the light-exit surface A1.

Figure 13:
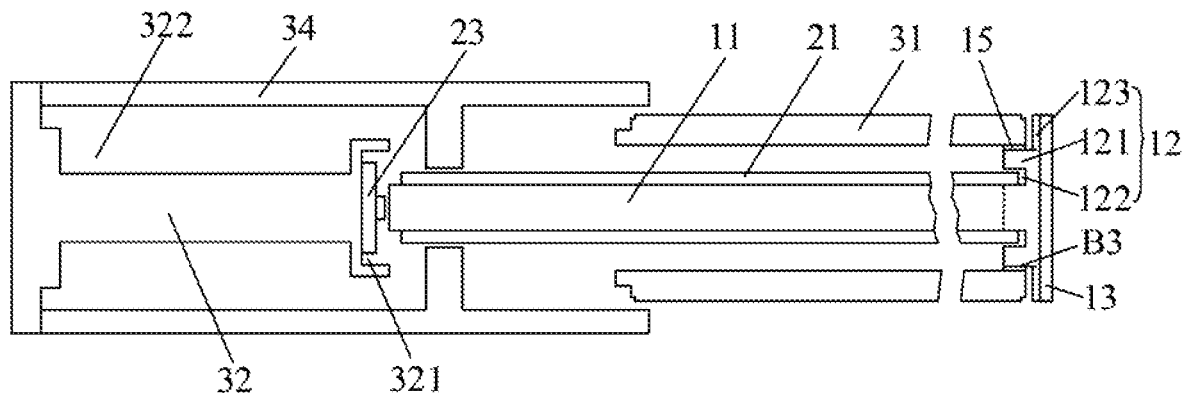
FIG. 13 is a schematic diagram of another display module according to some embodiments of the present disclosure.
Figure 14:
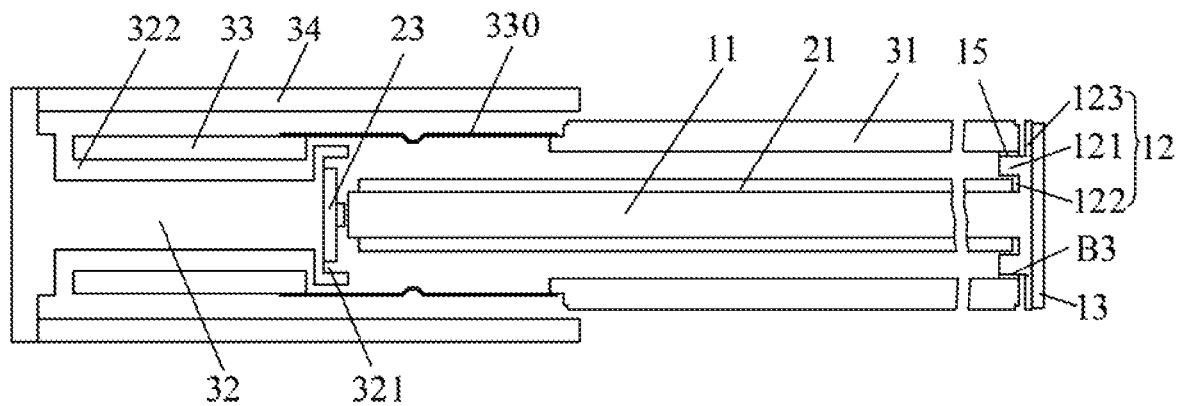
FIG. 14 is a schematic diagram of yet another display module according to some embodiments of the present disclosure.
Figure 15:
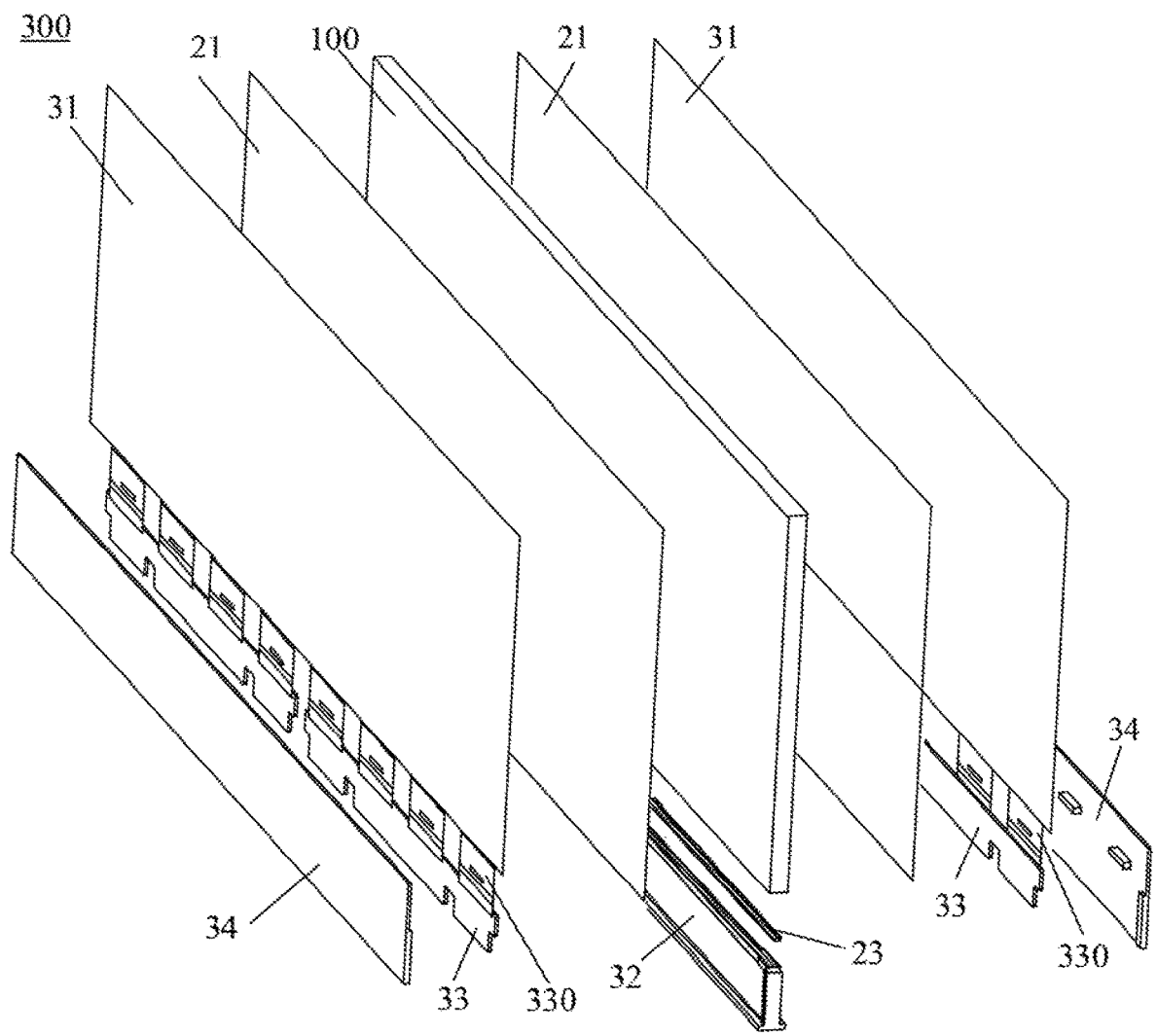
FIG. 15 is an exploded schematic diagram of the display module shown in FIG. 14.
Figure 16:
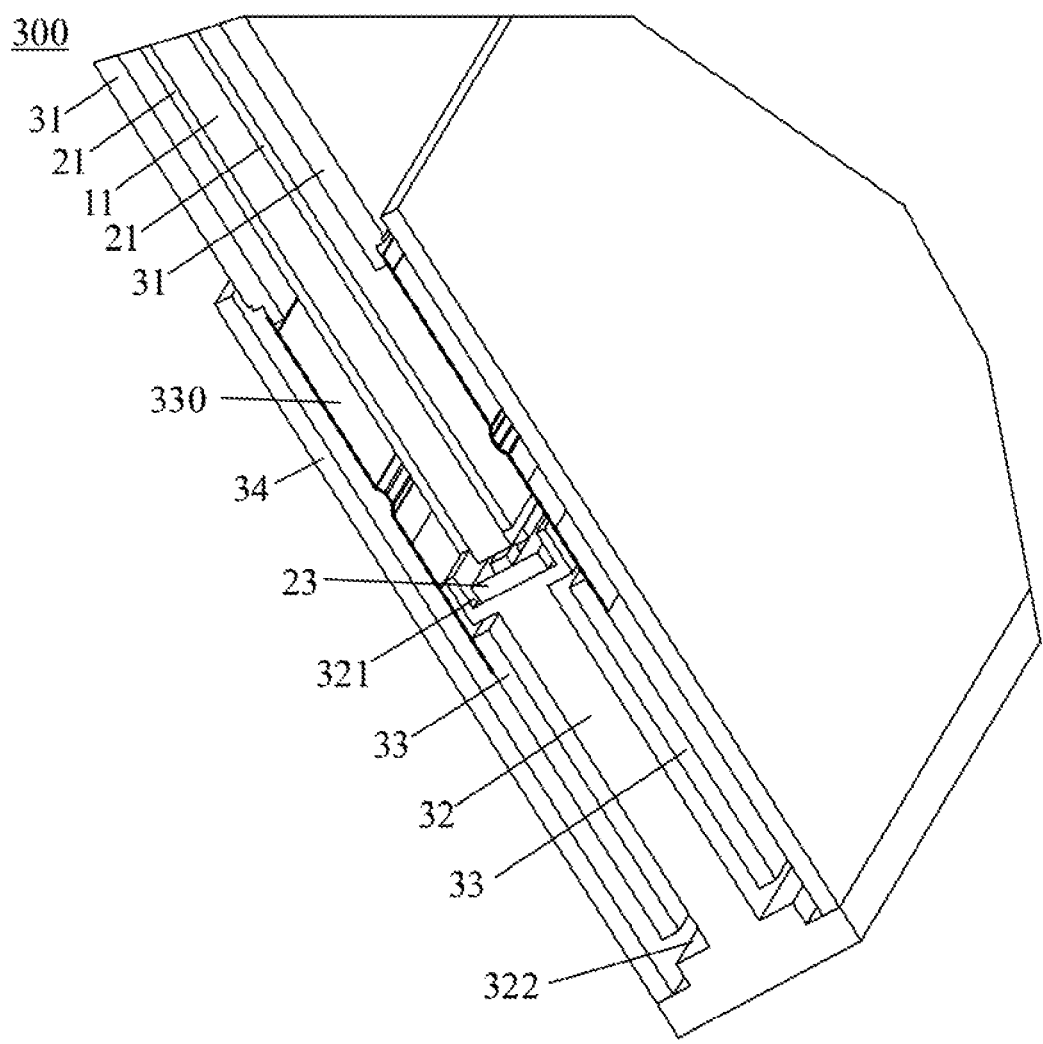
FIG. 16 is a partial schematic diagram of the display module shown in FIG. 14.

Based on this, referring to FIGS. 13 to 15, a plurality of convex portions are provided on a surface of the encapsulation cover plate 34 proximate to the circuit board 33. The COF 330 includes a plurality of openings that are in one-to-one correspondence with the plurality of convex portions. In this way, each convex portion of the encapsulation cover plate 34 passes through a corresponding opening, and contacts the corresponding optical film group 21 (as shown in FIG. 13), which enables the encapsulation cover plate 34 to provide a good support for the COF 330 and the backlight module 200.

In addition, at least one reinforcing rib is provided on a surface of the encapsulation cover plate 34 parallel to the light-exit surface A1 of the light guide plate body 11, which can further improve a structural strength of the encapsulation cover plate 34, thereby improving a structural strength of the display module 300. The overall structural strength of the display module 300 is jointly provided by the base 32, the encapsulation cover plate 34, the display panel 31, and the light guide plate 100, and the like.

Figure 17:
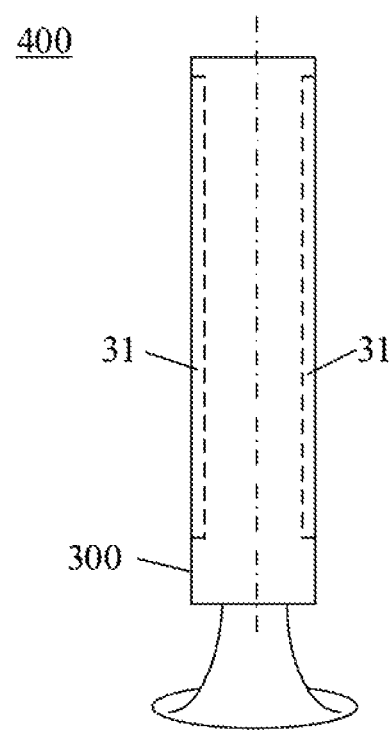
FIG. 17 is a schematic diagram of a display device according to some embodiments of the present disclosure.

Referring to FIG. 17, some embodiments of the present disclosure provide a display device 400. The display device 400 includes the display module 300 as provided in some embodiments as described above. Beneficial effects achieved by the display device 400 are the same as those achieved by the display module 300 provided in some embodiments described above, which will not be repeated herein.

In some embodiments, the display device 400 is a product or component having a double-sided display function, such as a double-sided display screen, a double-sided display digital photo frame, or the like.

In the description of the embodiments, specific features, structures, materials or characteristics may be combined in any suitable manner in any one or more embodiments or examples.

The foregoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A light guide plate, comprising:
a light guide plate body having two light-exit surfaces that are opposite and parallel, and at least one light-incident surface that intersects the two light-exit surfaces; and
a mounting portion located on a non-light-incident side of the light guide plate body, the mounting portion and the light guide plate body being an integrated structure, and
a portion of the mounting portion located on a light-exit side of each light-exit surface of the two light-exit surfaces being configured to mount an optical film group and a display panel,
wherein the light guide plate has a light-exit area directly facing a display area of the display panel, and
wherein the light guide plate further comprises a light-shielding layer disposed on an outer surface of the mounting portion located outside the light-exit area.

2. The light guide plate according to claim 1, wherein the mounting portion includes at least one bearing platform located on the light-exit side of each light-exit surface, a surface of the at least one bearing platform facing away from the light-exit surface being configured to bear the display panel.

3. The light guide plate according to claim 2, wherein there is a space between a surface of the at least one bearing platform facing the light-exit surface and the light-exit surface, the space being configured to mount the optical film group.

4. The light guide plate according to claim 3, wherein at least one through hole with an axis perpendicular to the light-exit surface is disposed in the at least one bearing platform, the at least one through hole being configured to allow a fastener to pass therethrough, so as to fasten the optical film group mounted in the space.

5. The light guide plate according to claim 2, wherein the mounting portion further includes a position-limiting portion located on the surface of the at least one bearing platform facing away from the light-exit surface;
an orthographic projection of the position-limiting portion on the light-exit surface is outside an orthographic projection of the display panel on the light-exit surface, and the position-limiting portion is configured to limit a movement of the display panel in at least parts of directions parallel to the light-exit surface.

6. The light guide plate according to claim 1, further comprising at least one support portion; wherein the mounting portion has at least one first end surface facing away from the light guide plate body; and the at least one support portion is disposed on the at least one first end surface.

7. The light guide plate according to claim 1, wherein a material of the light-shielding layer includes an ink with a light transmittance of less than or equal to 10%.

8. The light guide plate according to claim 1, wherein the surface of the mounting portion provided with the light-shielding layer is a matte surface.

9. The light guide plate according to claim 1, wherein the light guide plate body includes a light guide plate body with netted dots or a light guide plate body nanoparticles.

10. A backlight module, comprising:

the light guide plate according to claim 1; and two optical film groups mounted in the mounting portion, the two optical film groups being located on two light-exit sides of the light guide plate body, respectively.

11. The backlight module according to claim 10, wherein the mounting portion includes at least one bearing platform located on the light-exit side of each light-exit surface of the light guide plate body; there is a space between a surface of the at least one bearing platform facing the light-exit surface and the light-exit surface, and each optical film group of the two optical film groups is inserted and mounted in the space; and at least one through hole with an axis perpendicular to the light-exit surface is disposed in the at least one bearing platform; the backlight module further comprises a fastener disposed to match each through hole, the fastener is in contact with a respective optical film group of the two optical film groups, and fastens the optical film group to the light-exit side of the light guide plate body.

12. The backlight module according to claim 10, further comprising a backlight source disposed opposite to the at least one light-incident surface of the light guide plate body.

13. A display module, comprising:

the backlight module according to claim 10; and two display panels mounted in the mounting portion, each display panel being located on a side of a respective one of the two optical film groups facing away from the light guide plate body.

14. The display module according to claim 13, wherein the mounting portion includes at least one bearing platform located on the light-exit side of each light-exit surface of the light guide plate body; and each display panel is fastened to a surface of the at least one bearing platform facing away from the light-exit surface.

15. The display module according to claim 13, wherein the backlight module further includes a backlight source;

the display module further comprises a base; wherein the base is disposed opposite to a light-incident surface of the light guide plate body, the base includes a backlight source accommodating groove disposed on a surface of the base opposite to the light-incident surface, and the backlight source is disposed in the backlight source accommodating groove.

16. The display module according to claim 15, wherein the base further includes two circuit board accommodating grooves, each circuit board accommodating groove being disposed on a respective one of two side surfaces of the base parallel to the light-exit surface; and the display module further comprises two circuit boards, each circuit board being disposed in a respective circuit board accommodating groove of the two circuit board accommodating grooves, and electrically connected to a respective one of the two display panels.

17. The display module according to claim 16, further comprising:

two encapsulation cover plates disposed on the base, each encapsulation cover plate being located on a side of a respective one of the two circuit boards facing away from a bottom of the circuit board accommodating groove;

an orthographic projection of each circuit board on the light-exit surface being within an orthographic projection of a corresponding encapsulation cover plate on the light-exit surface.

18. A display device, comprising the display module according to claim 13.

* * * * *